United States Patent [19]
Kleiman

[11] 3,868,425
[45] Feb. 25, 1975

[54] STABILIZED VINYLIDENE BROMIDE
[75] Inventor: Joseph P. Kleiman, Birmingham, Mich.
[73] Assignee: Ethyl Corporation, Richmond, Va.
[22] Filed: May 23, 1973
[21] Appl. No.: 363,072

[52] U.S. Cl............................ 260/652.5 P, 252/607
[51] Int. Cl.............................................. C07c 17/40
[58] Field of Search................ 260/652.5 R, 652.5 P

[56] References Cited
UNITED STATES PATENTS
2,616,881   11/1952   Seymour....................... 260/86.3 X

*Primary Examiner*—Howard T. Mars
*Attorney, Agent, or Firm*—Donald L. Johnson; Robert A. Linn

[57]           ABSTRACT

Polybrominated hydrocarbons are stabilized by unsaturated ketones, for example, methyl vinyl ketone.

2 Claims, No Drawings

STABILIZED VINYLIDENE BROMIDE

BACKGROUND OF THE INVENTION

British Pat. Specification No. 1,139,854 teaches stabilizing vinylidene bromide with styrene.

SUMMARY OF THE INVENTION

This invention pertains to stabilized compositions of the following type: Vinylidene bromide stabilized with a stabilizing amount of a ketone having up to about 12 carbons and the formula

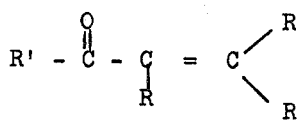

wherein R is selected from the class consisting of hydrogen and lower alkyl, and R' is lower alkyl.

A preferred embodiment is a stabilized vinylidene bromide composition in which the vinylidene bromide contains a stabilizing amount of a stabilizer of the above formula in which the R groups on the terminal carbon are hydrogen, the other R is selected from hydrogen, alkyl radicals of 1–5 carbons, and halogen radicals.

A more preferred embodiment comprises vinylidene bromide stabilized with methyl vinyl ketone. Another more preferred embodiment is vinylidene bromide stabilized with methyl isoprenyl ketone.

DESCRIPTION OF PREFERRED EMBODIMENTS

This invention pertains to stabilization of vinylidene bromide, a brominated hydrocarbon which is susceptible to deterioration upon standing.

Generally, any ketone with a vinyl or substituted vinyl radical attached to the carbonyl carbon and which stabilizes vinylidene bromide, can be used in this invention. The preferred additives are soluble in the amounts employed. More preferably, the additives should have up to about 12 carbons and should not react or otherwise decompose, whereby the stabilization is diminished to an undesirable extent during the period for which stabilization is desired.

Below are listed non-limiting examples of hydrocarbyl groups which may be present in the above general formula as groups R or R'.

Examples of alkyl groups represented by the groups R and R' in the above general formula are the lower alkyl groups such as those having up to about five carbons, e.g., methyl, ethyl, n-propyl, isopropyl, n-butyl, isobutyl, sec-butyl, tert-butyl, n-amyl, and the various positional isomers thereof, and likewise the corresponding straight and branched chain isomers of hexyl, heptyl, octyl, nonyl, decyl, undecyl, dodecyl, and the like.

When said groups R and R' are cycloalkyl groups, they may be lower cycloalkyl such as cyclopropyl, cyclobutyl, cyclopentyl, or also cyclohexyl, cycloheptyl, cyclooctyl, cyclononyl, cyclodecyl, cycloundecyl, cyclododecyl, and the like. They may also be such cyclo-aliphatic groups as α-cyclopropyl-ethyl, α-cyclobutyl-propyl, and similar alkyl derivatives of the higher cycloalkyls.

When the groups R and R' are aralkyl groups, they may be benzyl, phenylethyl, 1-phenylpropyl, 2-phenylpropyl, 3-phenylpropyl, 1-, and 2-isomers of phenylisopropyl, 1-, 2-, and 3-isomers of phenylbutyl and the like.

The compounds may contain a non-hydrocarbon substituent such as —Cl, or —Br, preferably bonded to the vinyl carbon adjacent to the carbonyl carbon such as in methyl chloroprenyl ketone.

Of the stabilizers mentioned above, those in which R' is methyl are preferred. Of these, a more preferred type of compound are those in which the terminal R groups are hydrogen and the other R is hydrogen, alkyl of from one to about five carbon atoms, or halogen.

Thus, preferred stabilizers of this invention are methyl vinyl ketone, methyl isoprenyl ketone and the like.

Although one stabilizer can be used, vinylidene bromide can be stabilized with mixtures of ketone of the type described above. Two, three or more ketones can be used as the stabilizer additive. A suitable mixture is methyl vinyl ketone and methyl isoprenyl ketone.

A stabilizing amount of stabilizer is employed. The amount used can be varied and is dependent, at least to some extent, on the activity of the stabilizer. By tests, such as described below, stabilization achieved by various additive concentrations can be observed. With the data obtained, a skilled practitioner can select the desired concentration. In general, the amount of stabilizer is less than 20 weight per cent, usually less than 15 per cent and preferably from 0.5 to 15 per cent by weight. A more preferred concentration range is from about 1 to about 10 weight per cent.

The stabilizer additive and halogenated material to be stabilized can be admixed in any known manner.

EXAMPLE

Methyl vinyl ketone was added to a batch of freshly distilled vinylidene bromide so that the ketone concentration was about 7 weight per cent.

The mixture was divided into five vials, of which 5 were stored under nitrogen and 5 in air. All vials were stored in the dark at 110° F. From time to time, the vials were visually examined for polymer.

Three days after storage was initiated, one air sample had polymer. Twenty-one days after storage was initiated, two more samples kept in air had polymer and 15 days after that, another air sample was found to have polymer. Forty-two days after storage was initiated, all air samples had polymer and so did two of the samples stored under nitrogen. Four days after that, only one sample had no polymer by visual inspection.

In contrast, unstabilized vinylidene bromide starts polymerizing under nitrogen in a few minutes even if cooled in an ice bath.

As shown by the above results, an inert atmosphere can be efficaciously employed when storing the stabilizer-vinylidene bromide compositions of this invention. Such use is a preferred embodiment of this invention. Besides nitrogen, other inert gases such as argon, neon, and the like, can also be employed.

In a similar manner, 1-10 weight per cent of methyl vinyl ketone, ethyl vinyl ketone, decyl vinyl ketone, methyl isoprenyl ketone, methyl chloroisoprenyl ketone, methyl bromoisoprenyl ketone, pent-3-ene-2-one, 4-methyl-3-pentene-2-one, 4-methyl-3-hexene-2-one, 4-cyclohexyl-3-penten-2-one, also stabilize vinylidene bromide.

I claim:

1. Vinylidene bromide stabilized with a stabilizing amount of less than 20 weight % of a ketone having up to about 12 carbon atoms and the formula

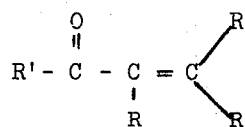

wherein R is selected from the class consisting of hydrogen and lower alkyl of up to five carbons, and R' is lower alkyl of up to about five carbons.

2. A stabilized composition of claim 1 wherein said ketone is methyl vinyl ketone.

* * * * *